W. S. BATES.
Speed-Indicator.
No. 199,682. Patented Jan. 29, 1878.
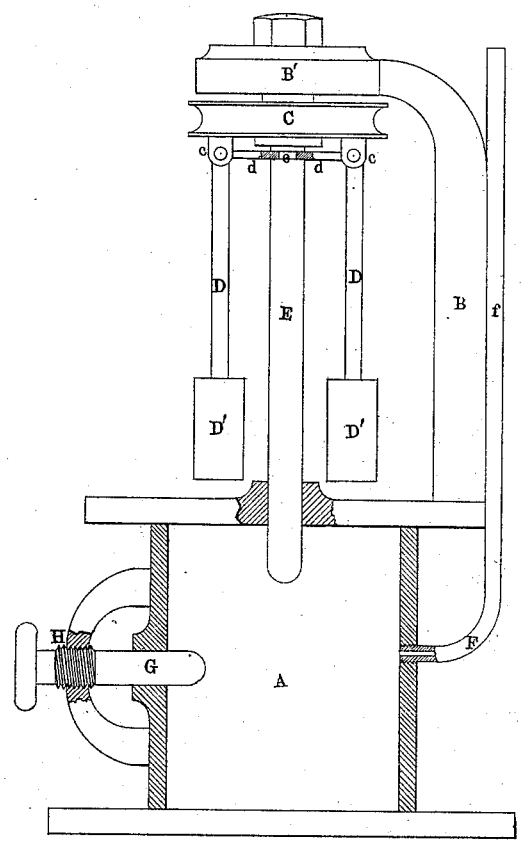
ATTEST:
William Crow
Philip Crook
INVENTOR
Wm S Bates

UNITED STATES PATENT OFFICE.

WILLIAM S. BATES, OF CINCINNATI, OHIO.

IMPROVEMENT IN SPEED-INDICATORS.

Specification forming part of Letters Patent No. 199,682, dated January 29, 1878; application filed October 27, 1877.

*To all whom it may concern:*

Be it known that I, WILLIAM S. BATES, of Cincinnati, in Hamilton county, Ohio, have invented certain Improvements in Speed or Revolution Indicators, of which the following is a specification:

My invention relates to devices for indicating speed, whereby the velocity of revolution of a shaft or the speed of a vehicle may be learned by a glance at an index, and without counting; and consists in a closed vessel containing fluid, a plunger for causing a pressure therein, and a pressure-meter for indicating the amount of said pressure or the velocity of motion corresponding thereto, said plunger being caused to produce said pressure by the centrifugal force of one or more revolving weights; also, in combining with said closed vessel an adjusting-stem capable of being caused to exert a greater or less force on the fluid contained therein, whereby the pressure may be increased or relieved, so as to bring the index to the zero-point when the instrument is at rest.

The drawing represents, in elevation, a revolution-indicator containing my invention, certain parts being cut away for the more perfect exhibition of the same.

A is a closed vessel, containing fluid. B is an upright, supporting the head B'. C is a pulley, revolving on a wrist attached to the the head B'. On this pulley C are lugs $c\ c$, to which are pivoted bent levers D D. The horizontal arms $d\ d$ of these levers are forked to embrace the wrist $e$ of the plunger E. On the vertical arms are weights D' D'.

The plunger E is capable of motion in the direction of its axis, and extends through the top of the closed vessel A, so as to bear upon the fluid contained therein.

F is a tube communicating with the closed vessel A. The upper part $f$ of the tube is of glass.

G is an adjusting-stem, movable in the direction of its axis by means of the screw H.

Operation: The pulley C, being revolved, carries with it the levers and weights D D'. The weights, having an outward tendency from centrifugal force, exert a force in the direction of its axis upon the plunger E, and cause it to produce a pressure in the vessel A, the amount of this pressure depending on the velocity of revolution of the weights. A portion of the contents of the vessel is thus caused to rise in the tube, and to a height depending on the pressure, thus indicating the velocity of revolution of the weights, the scale being graduated in revolutions per minute or other unit of time.

The bore of the tube is small compared with the plunger, so that the motion of the latter may not be too great, for the smaller the plunger the greater its motion must be to produce a given pressure.

Instead of the tube, a steam-gage or other pressure-meter may be used. With a manometric tube or similar gage the instrument is more delicate, if the plunger be relatively small. If an incompressible liquid—such as water—be used with a manometric tube-gage, the motion of the weights in a radial direction will be very small, and the instrument can be made more compact.

When applied to vehicles the scale may be graduated in miles per hour.

The stem G is for the purpose of adjustment, to correct variations due to temperature, &c. If, for instance, the instrument, when at rest, indicates more or less than zero, the stem G must be screwed out or in, respectively, until the error is removed. In this way the instrument may be adjusted with perfect ease whenever the engine whose speed it indicates is at rest or disconnected from it.

The plunger E and stem G may be packed in any suitable manner to prevent leakage.

I, of course, do not limit myself to the precise arrangement of parts shown, it being evident that many methods may be used for converting the centrifugal force of the weights into pressure on the plunger; but

I claim—

In combination with one or more revolving weights, a closed vessel containing fluid, and a plunger for converting the centrifugal force of said weight into pressure in the fluid, the velocity of revolution being measured by the amount of said pressure, substantially as described.

WM. S. BATES.

Attest:
 WILLIAM CROW,
 N. B. WESCOTT.